(12) United States Patent
Matteson

(10) Patent No.: US 12,276,564 B2
(45) Date of Patent: Apr. 15, 2025

(54) FIXTURE AND METHOD FOR DETERMINING THE CENTER OF GRAVITY OF A REMOTE CONTROLLED AIRCRAFT

(71) Applicant: Michael Matteson, Macedon, NY (US)

(72) Inventor: Michael Matteson, Macedon, NY (US)

( * ) Notice: Subject to any disclaimer, the term of this patent is extended or adjusted under 35 U.S.C. 154(b) by 314 days.

(21) Appl. No.: 18/061,209

(22) Filed: Dec. 2, 2022

(65) Prior Publication Data

US 2023/0393010 A1 Dec. 7, 2023

Related U.S. Application Data

(60) Provisional application No. 63/349,381, filed on Jun. 6, 2022.

(51) Int. Cl.
*G01M 1/12* (2006.01)
*B64F 5/60* (2017.01)

(52) U.S. Cl.
CPC .............. *G01M 1/125* (2013.01); *B64F 5/60* (2017.01)

(58) Field of Classification Search
CPC ............... B64U 10/16; B64U 2101/30; B64U 2201/20; B64U 30/299; B64U 50/14; B64U 60/50; B64U 50/19; B64U 50/30; G01M 1/125; B64C 27/001; B64C 2025/008; B64C 2025/325; B64C 25/001; B64C 25/26; B64C 25/32; B64C 25/52; B64C 27/20; B64C 39/024; G05B 19/19; G05B 19/402; G05B 2219/45055; G05D 1/101; G05D 1/0077; G08C 17/02; G01G 19/07
See application file for complete search history.

(56) References Cited

U.S. PATENT DOCUMENTS 9,656,749 B1 * 5/2017 Hanlon ..................... G01M 1/10
2017/0322101 A1 * 11/2017 Chang ........................ B64F 5/60

FOREIGN PATENT DOCUMENTS

CN 203620244 U * 6/2014

* cited by examiner

*Primary Examiner* — Kristina M Deherrera
*Assistant Examiner* — Gedeon M Kidanu
(74) *Attorney, Agent, or Firm* — Woods Oviatt Gilman LLP; Katherine H. McGuire, Esq.

(57) ABSTRACT

A device for determining the center of gravity (CG) of a remote controlled aircraft includes a base member having a slotted track defined therein and a plurality of support platforms mounted on the base member. Each support platform of the plurality of support platforms is slidably positionable along the slotted track and each support platform may receive a digital CG sensor thereon. A plurality of leveling members is also mounted on the base member, with each leveling member of the plurality of leveling members being independently vertically translatable to adjust the orientation of the base member until the base member is level with the horizontal plane.

4 Claims, 4 Drawing Sheets

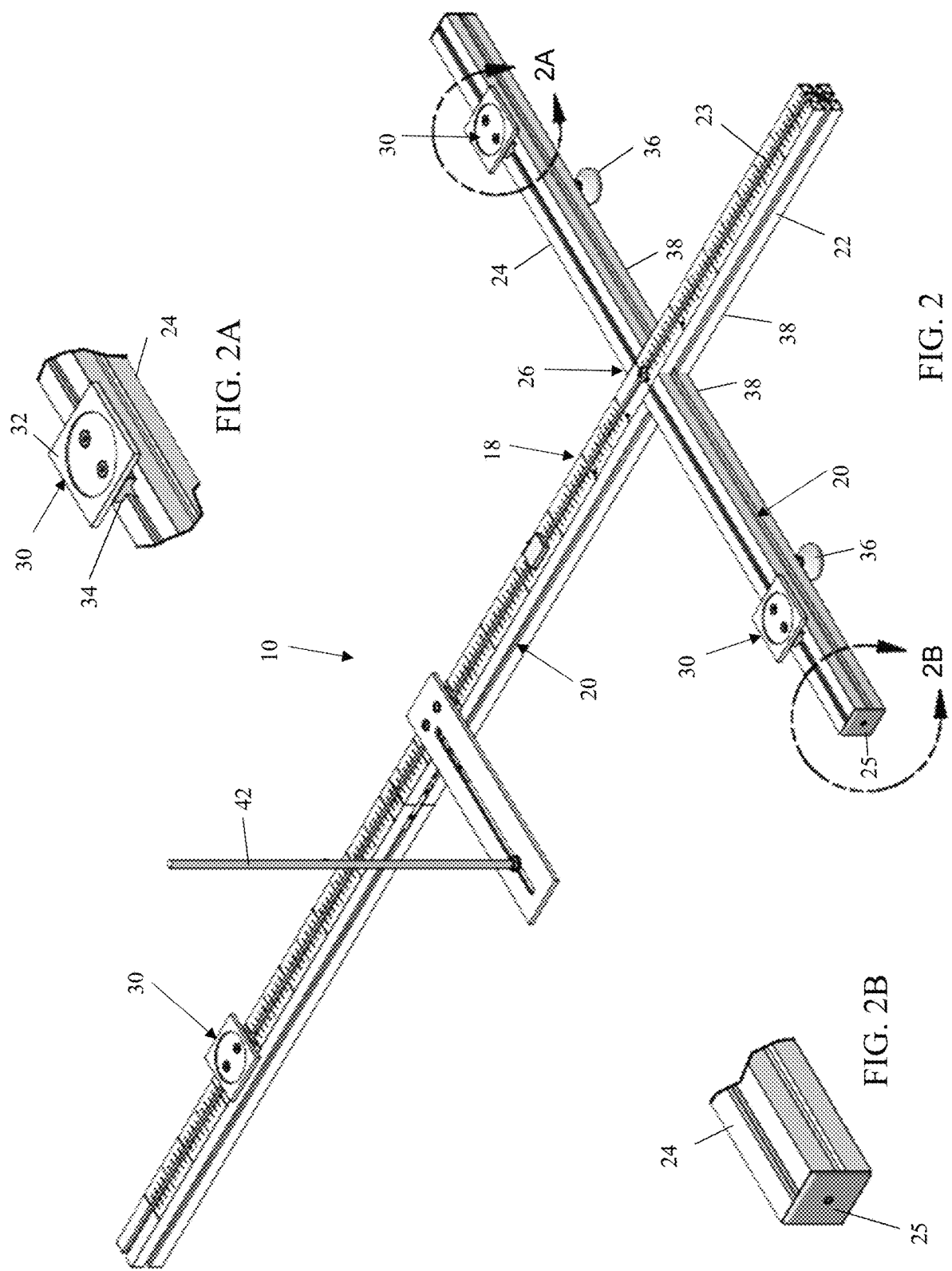

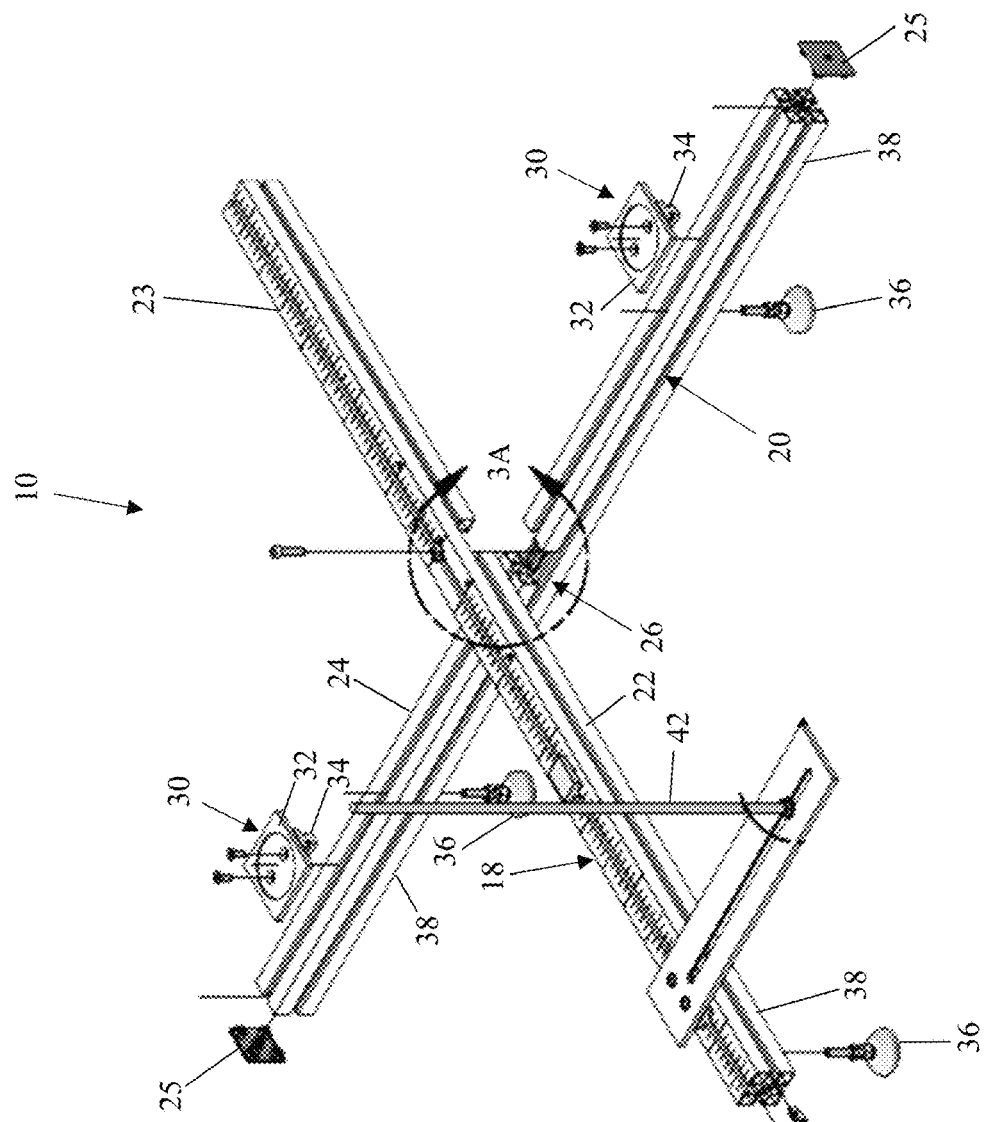
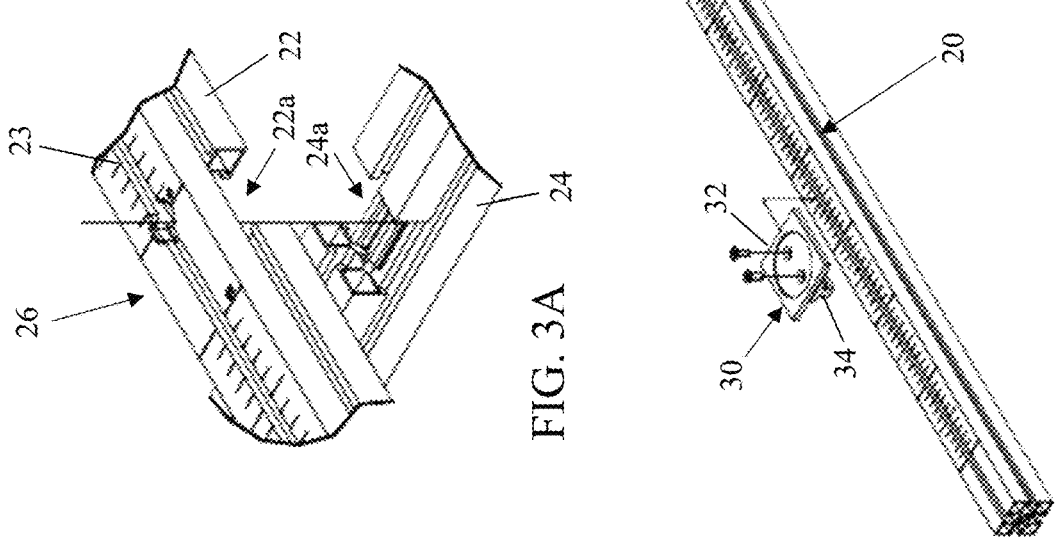
FIG. 3
FIG. 3A

FIXTURE AND METHOD FOR DETERMINING THE CENTER OF GRAVITY OF A REMOTE CONTROLLED AIRCRAFT

CROSS-REFERENCE TO RELATED APPLICATIONS

This application claims the benefit of U.S. Provisional Application No. 63/349,381 filed on Jun. 6, 2022, which is incorporated by reference herein in its entirety.

FIELD OF THE INVENTION

The present invention generally relates to a measuring device, and more particularly to a measuring device for determining the center of gravity of an object, and still more particularly to a device and method for determining the center of gravity of a remote controlled aircraft.

BACKGROUND OF THE INVENTION

Proper flight of remote controlled aircraft requires optimal set up of the aircraft prior to flight. For instance, the weight and center of gravity (CG) of the aircraft must be properly balanced for the aircraft to fly as intended. Micro-adjustments to the aircraft may need to be made to ensure the aircraft behaves properly when in the air. A number of these micro-adjustments are dependent upon the location of the CG of the aircraft. To date, current devices and techniques to determine the correct CG of an aircraft are imprecise and/or time consuming. Thus, there is a need for a device and method for determining the center of gravity of a remote controlled aircraft that is accurate and efficient. The present invention satisfies this as well as other needs.

SUMMARY OF THE INVENTION

The present invention is generally directed to a device for determining the center of gravity (CG) of a remote controlled aircraft. In accordance with an embodiment of the present invention, the device comprises: a) a base member including a slotted track defined therein; b) a plurality of support platforms mounted on the base member, wherein each support platform of the plurality of support platforms is slidably positionable along the slotted track, and wherein each support platform is configured to receive a digital CG sensor thereon; and c) a plurality of leveling members mounted on the base member, wherein each leveling member of the plurality of leveling members is independently vertically translatable to adjust the orientation of the base member until the base member is level with the horizontal plane.

In a further aspect of the present invention, the base member may be generally T-shaped including a first arm arranged perpendicular to a second arm. Each of the first arm and the second arm comprise either a t-slotted track or a t-slotted quad rail and the first arm may be secured to the second arm through a cross lap joint. The slotted track may also include reference indicia along the base member whereby the position of the plurality of support platforms is indexed. A wing edge indicator may also be mounted on the base member and be slidably positionable along the slotted track.

In accordance with another aspect of the present invention, the present invention is generally directed to a method for determining the center of gravity (CG) of a remote controlled aircraft, the method comprising: a) providing a CG measurement device including a base member having a slotted track defined therein and a plurality of support platforms mounted on the base member, wherein each support platform of the plurality of support platforms is slidably positionable along the slotted track; b) positioning a respective digital CG sensor on each support platform, wherein each respective digital CG sensor includes a mass scale to measure a mass of the aircraft at each respective digital CG sensor; c) placing a respective wheel of the aircraft on each respective digital CG sensor; d) measuring: i) a first distance between front and rear wheels of the aircraft; ii) a second distance from main wheels of the aircraft and a leading edge of each wing, wherein the second distance is subtracted from a manufacturer-provided CG location to yield a third distance; and e) calculating a CG location of the aircraft using each mass measurement recorded by each respective digital CG sensor, the first distance and the third distance.

In still another aspect, the method may further include: adjusting mass on the aircraft until the calculated CG is substantially equal to the manufacturer-provided CG location and/or leveling the aircraft wings with respect to the horizontal plane.

Additional objects, advantages and novel aspects of the present invention will be set forth in part in the description which follows, and will in part become apparent to those in the practice of the invention, when considered with the attached figures.

BRIEF DESCRIPTION OF THE DRAWINGS

FIG. 2 is perspective schematic view of an exemplary CG measuring device in accordance with an embodiment of the present invention;

FIGS. 2A and 2B are expanded views of the exemplary embodiment of a CG measuring device as shown in FIG. 2;

FIG. 3 is an exploded view of the exemplary embodiment of a CG measuring device shown in FIG. 2;

FIG. 3A is an expanded view of the exemplary embodiment of a CG measuring device as shown in FIG. 3;

DETAILED DESCRIPTION OF THE PREFERRED EMBODIMENTS

Figure 1A:
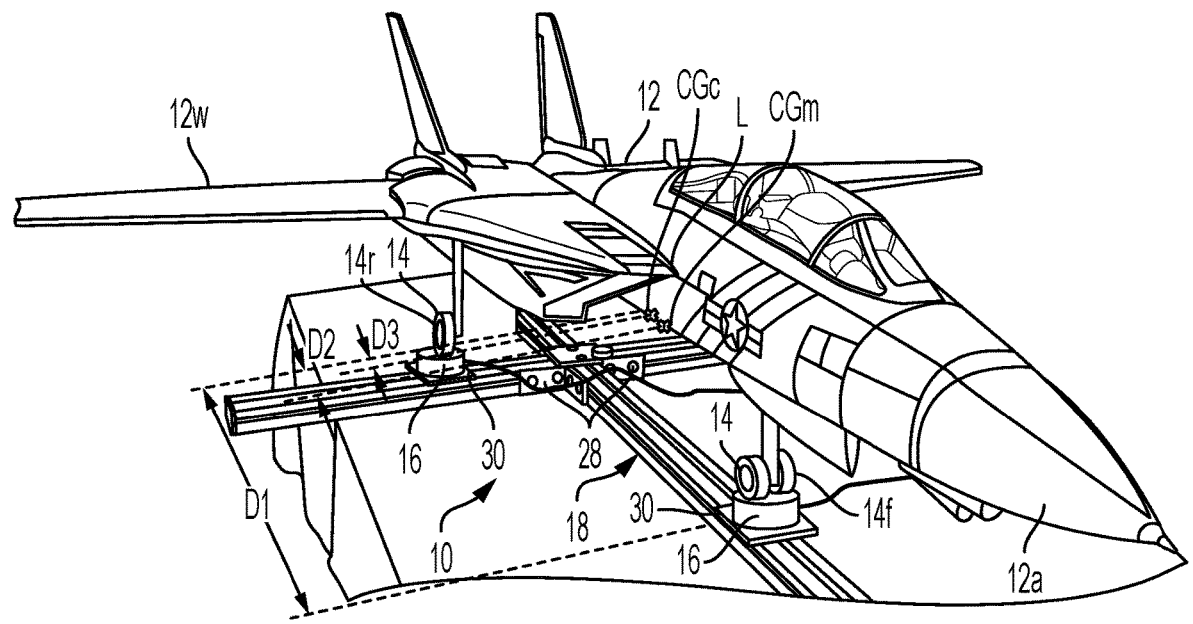
FIG. 1A is a front perspective view of an exemplary aircraft equipped with tricycle landing gear positioned on an embodiment of a CG measuring device in accordance with the present invention.
Figure 1B:
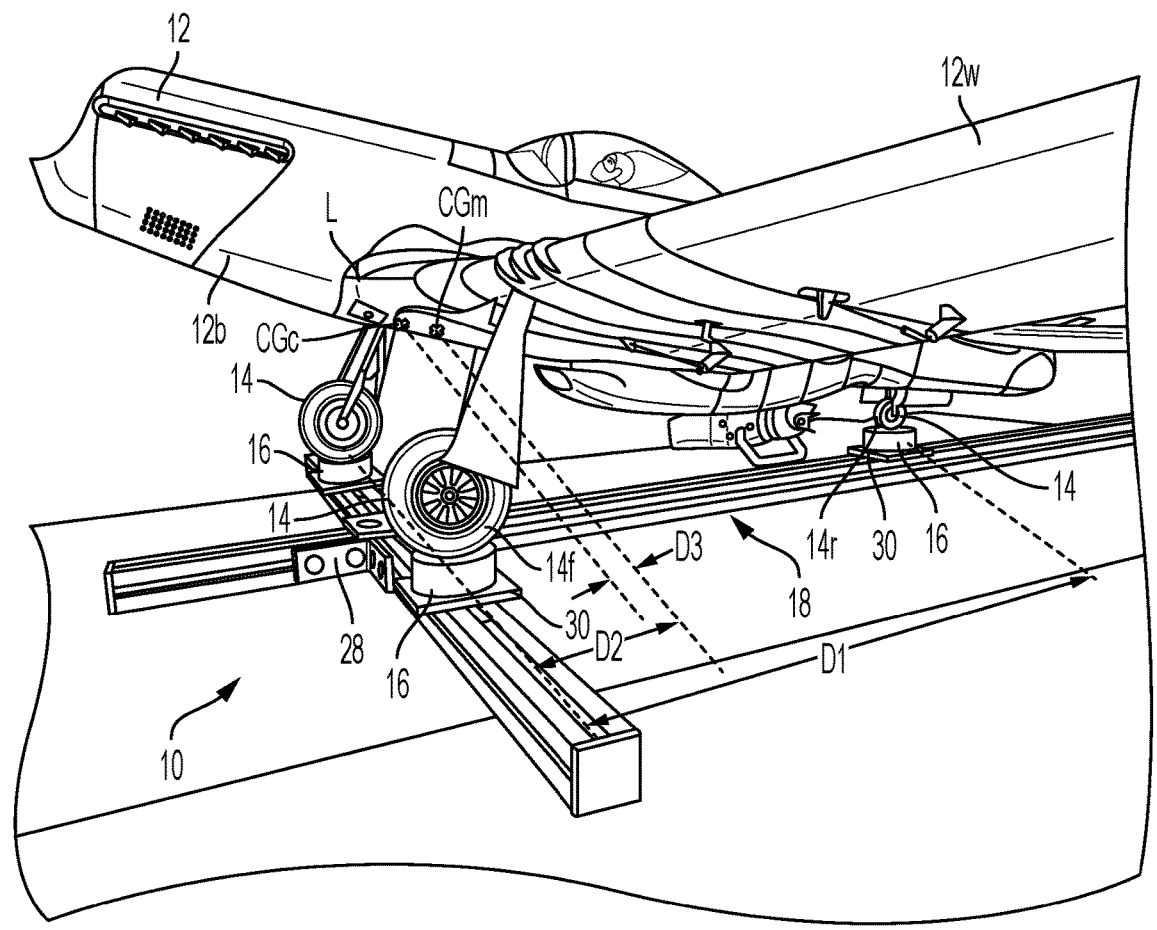
FIG. 1B is a side perspective view of an exemplary aircraft equipped with bicycle landing gear positioned on the embodiment of a CG measuring device shown in FIG. 1.

This description is made for the purpose of illustrating the general principles of the invention and should not be taken in a limiting sense. Referring generally now to FIGS. 1A and 1B, in accordance with an aspect of the present invention, an exemplary embodiment of device 10 for determining the center of gravity (CG) of a remote controlled aircraft 12 is shown with wheels 14 of aircraft 12 positioned atop respective digital CG sensors 16, which are in turn mounted onto device 10. As can be seen in FIGS. 1A and 1B, device 10 may be suitable for use with either a plane having tricycle landing gear (FIG. 1A, aircraft 12a) or bicycle landing gear (FIG. 1B, taildragger aircraft 12b). By way of example and without limitation thereto, one exemplary digital CG sensor kit may be the CGPRO40 digital weight and balance meter available from XICOY Electronica SL, Canet de Mar, Spain.

With reference to FIGS. 2-5, device 10 may generally include a base member 18 having a slotted track 20 defined therein. By way of example and without limitation, base member 18 may be generally T-shaped including a first arm 22 arranged perpendicular to a second arm 24. Each of the first arm 22 and the second arm 24 may comprise either a t-slotted track or a t-slotted quad rail whose terminal ends may capped with an endcap 25. See FIGS. 2 and 2B. As shown in FIGS. 3 and 3A, first arm 22 and second arm 24 may include respective corresponding notches 22a, 24a which are configured to form a cross lap joint 26. As shown in FIGS. 1A and 1B, angle brackets 28 may also be included to reinforce cross lap joint 26 and ensure that first and second arms 22, 24 remain perpendicularly oriented to one another.

Figure 4:
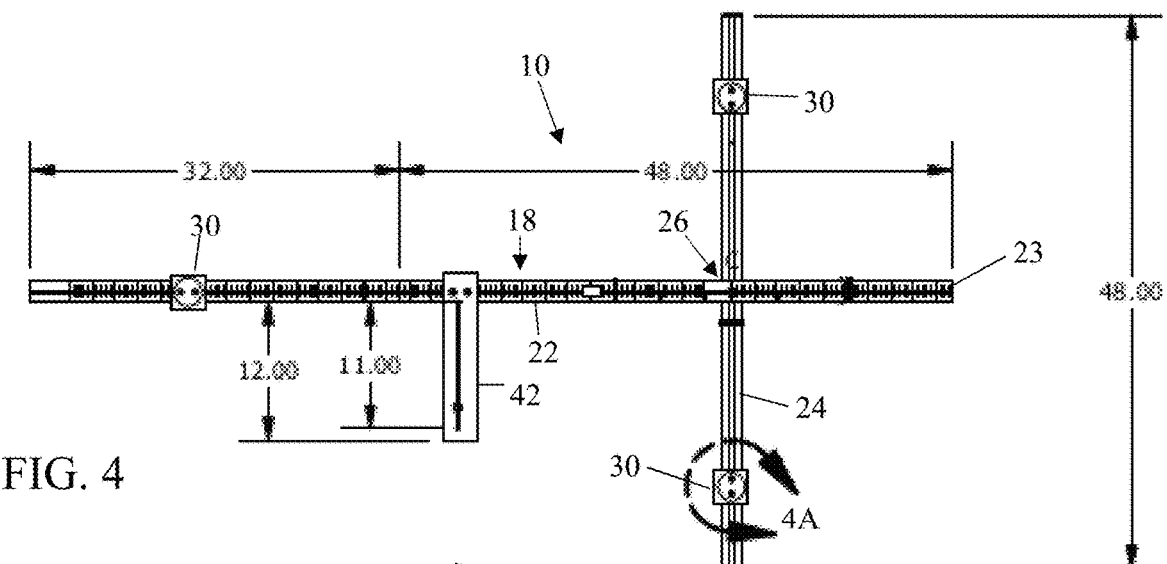
FIG. 4 is a top plan view of the exemplary embodiment of a CG measuring device shown in FIG. 2.
Figure 4A:
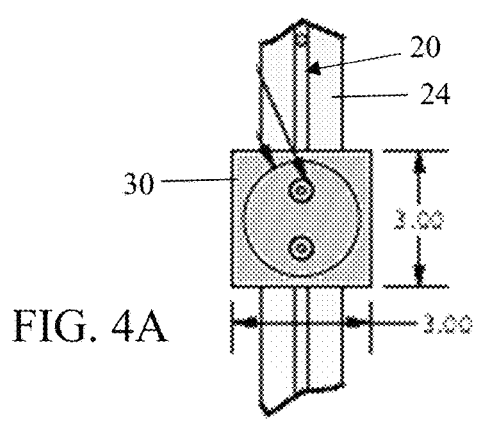
FIG. 4A is an expanded view of the exemplary embodiment of a CG measuring device shown in FIG. 4.

Referring again to FIGS. 2-5, device 10 may include a plurality of support platforms 30 mounted on base member 18. As shown most clearly in FIGS. 2A and 3, each support platform 30 may include a plate member 32 and a channeled member 34. Channeled members 34 are dimensioned to be received within slotted track 20 whereby each support platform 30 is selectively slidably positionable along first arm 22 and/or second arm 24. As shown in FIGS. 3, 3A and 4, first arm 22 and/or second arm 24 may also include reference indicia 23 thereon whereby the position of each of the plurality of support platforms 30 may be indexed and measured, as will be discussed in greater detail below.

Figure 5:
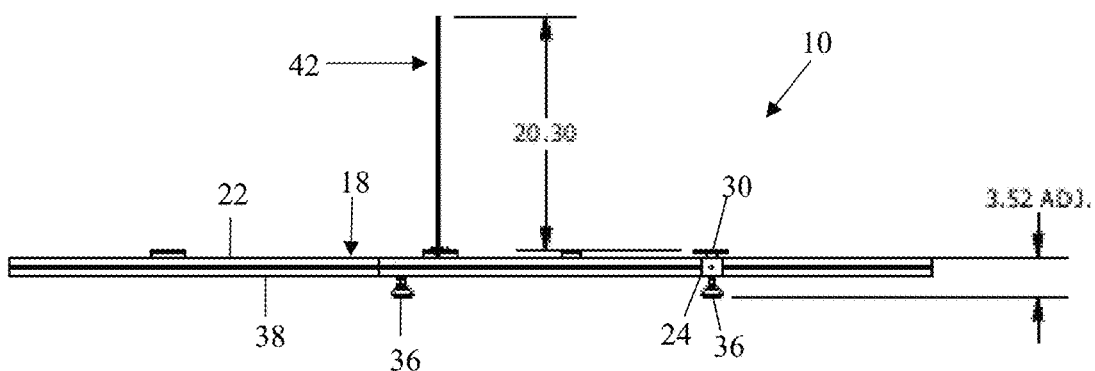
FIG. 5 is a side plan view of the exemplary embodiment of a CG measuring device shown in FIG. 2.

With reference to FIGS. 2, 3 and 5, base member 18 may also have a plurality of leveling members 36 mounted on the bottom surface 38, 40 of respective first arm 22 and second arm 24. Each leveling member 36 is independently vertically translatable to adjust the orientation of the base member 18 until base member 18 is level with the horizontal plane. A wing edge indicator 42 may be mounted on the base member 18 (such as first arm 22) and may be slidably positionable along the slotted track 20, as will be described in greater detail below. In a further aspect of the invention, a vertically adjustable tail level adapter (not shown) may also be employed with bicycle landing gear aircraft 12b (FIG. 1B) to selectively raise the rear wheel 14r until wing 12w is parallel (level) to the horizontal plane.

In a further aspect of the present invention, an exemplary method for determining the center of gravity (CG) of a remote controlled aircraft 12 may include: a) providing a CG measurement device 10 including a base member 18 having a slotted track 20 defined therein and a plurality of support platforms 30 mounted on the base member, wherein each support platform 30 of the plurality of support platforms is slidably positionable along the slotted track 20; b) positioning a respective digital CG sensor 16 on each support platform 30, wherein each respective digital CG sensor 16 includes a mass scale to measure a mass of aircraft 12 at each respective digital CG sensor 16; c) placing a respective wheel 14 of the aircraft 12 on each respective digital CG sensor 16; d) measuring: i) a first distance D1 between front 14f and rear wheels 14r of the aircraft 12; ii) a second distance D2 from main wheels (e.g., 14r for a tricycle aircraft) of the aircraft 12 and a leading edge L of each wing 12w, wherein the second distance D2 is subtracted from a manufacturer-provided CG location (CGm) to yield a third distance D3; and e) calculating a CG location (CGc) of the aircraft using each mass measurement recorded by each respective digital CG sensor 16, the first distance D1 and the third distance D3. Mass on aircraft 12 may be adjusted (e.g., added, removed or relocated) until the calculated CGc is substantially equal to the manufacturer-provided CGm location. Once CGc and CGm are equal, aircraft 12 may be properly balanced, thereby improving flight performance. In a further aspect of the invention, the aircraft wings may be leveled with respect to the horizontal plane prior to measuring the first distance and the second distance.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A method for determining the center of gravity (CG) of a remote controlled aircraft, the method comprising:
    a) providing a CG measurement device including a base member having a slotted track defined therein and a plurality of support platforms mounted on the base member, wherein each support platform of the plurality of support platforms is slidably positionable along the slotted track;
    b) positioning a respective digital CG sensor on each support platform, wherein each respective digital CG sensor includes a mass scale to measure a mass of the aircraft at each respective digital CG sensor;
    c) placing a respective wheel of the aircraft on each respective digital CG sensor;
    d) measuring:
        i) a first distance between front and rear wheels of the aircraft;
        ii) a second distance from main wheels of the aircraft and a leading edge of each wing, wherein the second distance is subtracted from a manufacturer-provided CG location to yield a third distance; and
    e) calculating a CG location of the aircraft using each mass measurement recorded by each respective digital CG sensor, the first distance and the third distance.

2. The method of claim 1 further comprising:
    f) adjusting mass on the aircraft until the calculated CG is substantially equal to the manufacturer-provided CG location.

3. The method of claim 2 further comprising:
    a) leveling a wing of the aircraft with respect to a horizontal plane prior to measuring the first distance and the second distance.

4. The method of claim 1 further comprising:
    a) leveling a wing of the aircraft with respect to a horizontal plane prior to measuring the first distance and the second distance.

* * * * *